United States Patent [19]

Hankosky et al.

[11] 4,447,036
[45] May 8, 1984

[54] FORCE LIMITING DEVICE FOR AN ACTUATOR ROD

[75] Inventors: Andrew Hankosky; Robert L. Clapper, both of Pittsburgh, Pa.

[73] Assignee: Rockwell International Corporation, Pittsburgh, Pa.

[21] Appl. No.: 277,430

[22] Filed: Jun. 25, 1981

Related U.S. Application Data

[63] Continuation of Ser. No. 102,700, Dec. 12, 1979, abandoned.

[51] Int. Cl.³ .................. F16K 31/122; F01B 15/02
[52] U.S. Cl. .................................. 251/63.4; 251/330; 92/86; 92/117 A; 92/134; 91/173
[58] Field of Search ............... 92/86, 117 A; 91/134, 91/173; 251/63.4, 330

[56] References Cited

U.S. PATENT DOCUMENTS

| 1,721,204 | 7/1929 | Burstall | 92/86 |
| 1,945,151 | 1/1934 | Marsh | 92/86 |
| 2,960,077 | 11/1960 | Bosi | 92/86 |
| 3,242,822 | 3/1966 | Barltrop | 91/173 |
| 4,174,656 | 11/1979 | Duffey | 92/134 |

FOREIGN PATENT DOCUMENTS

| 2336066 | 2/1975 | Fed. Rep. of Germany | 91/173 |
| 2302430 | 9/1976 | France | 91/173 |

Primary Examiner—Paul E. Maslousky

[57] ABSTRACT

A force limiting device for an actuator rod is used on a valve actuator of the type which includes hydraulic fluid being selectively applied to and discharged from a cylinder at a first side of a piston connected to the actuator rod as high pressure gas of an accumulator mounted on the cylinder acts in opposition thereto on a second side of the piston. The piston includes an interior cylindrical bore narrowing to an opening at the first side thereof which receives the actuator rod slidably therein. The actuator rod extends from the first side of the piston through a hole in the first end of the cylinder for coupling to a valve stem outwardly of the cylinder. An enlarged piston head is secured at a first side thereof to the other end of the rod and disposed within the interior cylindrical bore for sliding, sealed contact with an interior of the bore. Atmospheric pressure communicates with the bore to act on the second side of the piston head. The hydraulic fluid produces a pressure on the first side of the piston head which is opposed by atmospheric pressure at the second side to produce a maximum tensile force on the actuator rod when the piston is held against the piston stop at a second end of the cylinder by the hydraulic fluid which produces a force on the piston greater than the maximum tensile force on the actuator rod.

11 Claims, 5 Drawing Figures

FORCE LIMITING DEVICE FOR AN ACTUATOR ROD

This is a continuation of application Ser. No. 102,700, filed Dec. 12, 1979, now abandoned.

BACKGROUND OF THE INVENTION

1. Field of the Invention

This invention relates to a force limiting device for a valve actuator rod and, more specifically, such a device which produces a maximum tensile force thereon less than would normally be produced on a piston of a valve actuator associated with the actuator rod when the actuator has located the valve in a backseated position.

2. Description of the Prior Art

There have heretofore been utilized a number of means for closing large valves in the feedwater and steam systems of power plants. It is presently felt that a valve actuator incorporating a hydraulic cylinder and a gas accumulator affords an excellent means for rapid closure of these valves. Hydraulic oil is directed to a piston within the hydraulic cylinder to open the valve in opposition to a precharged source of high pressure gas which acts on the other side of the piston. A charge of high pressure gas is maintained in an accumulator to insure a sufficient quantity is available to act on the piston to rapidly close the valve when the high pressure is relieved.

While this system produces adequate force for opening and closing the valves, it has been found that the dimensions of such actuators and the pressures required are capable of producing a large tensile force on the actuator rod when the valve is in an open, backseated position. Accordingly, there have heretofore been utilized various force limiting devices in the form of couplings between the actuator rod and the valve stem to protect the valve during backseating. While these devices have reliably limited the tensile force, they have required an additional element and thus an added expense to the valve-actuator configuration. There remains a continuing need for a simple, reliable, inexpensive means for utilizing such a valve actuator while insuring the valve will not be damaged during backseating.

SUMMARY OF THE INVENTION

It is, therefore, an object of the invention to provide a force limiting device for an actuator rod which does not require a force limiting coupling between the actuator rod and the valve stem.

It is another object of the invention to provide a force limiting device of the type described which is safe and reliable and relatively inexpensive to manufacture.

These and other objects of the invention are provided by the preferred embodiment thereof in the form of a force limiting device for an actuator rod of a valve actuator of the type which includes hydraulic fluid from a first source being selectively applied to and discharged from a cylinder at a first side of a piston means mounted therein and connected to the actuator rod as fluid from a second source acts in opposition thereto on a second side of the piston means. The piston means has a central cavity therein which includes a cylindrical bore having a diameter which narrows into an opening at the first side of the piston means having a lesser cross sectional area than the bore. The actuator rod is slidably received within the opening to extend from the first side of the piston means through a hole in a first end of the cylinder and terminates at an extended end thereof which is outwardly of the cylinder and capable of being joined to a valve stem. An enlarged piston head is secured at a first side thereof to the other end of the rod and is disposed within the cylindrical bore for retention therein by a portion of the piston means around the opening. The piston head makes sliding, sealed contact with an interior of the bore for limited axial movement therein. There is included means for communicating with the bore to cause a predetermined fluid pressure from a third source different from the first and second sources to be applied to a second side of the piston head. The hydraulic fluid producing a pressure on the piston head is opposed by the predetermined fluid pressure to produce a maximum tensile force on the actuator rod when the piston means is being held against a piston stop at a second end of the cylinder by the hydraulic fluid to produce a force on the piston means greater than the maximum tensile force.

DETAILED DESCRIPTION OF THE PREFERRED EMBODIMENT

Figure 1:
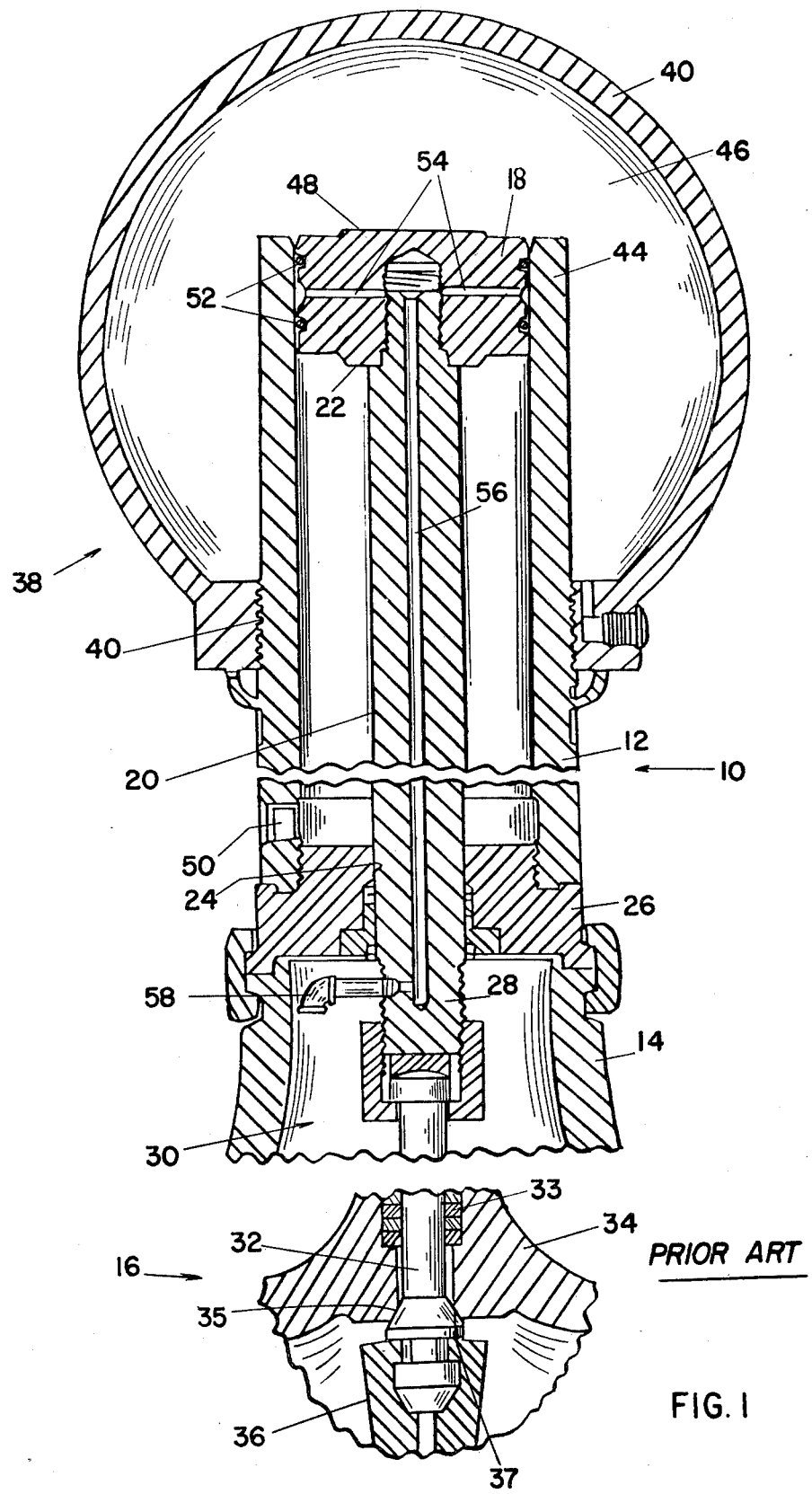
FIG. 1 is a sectional side view of a prior art valve actuator including a coupling between the actuator rod and the valve stem with the valve shown in a backseated position.

As can be seen in FIG. 1, a prior art valve actuator 10 without any form of lost motion device includes a hydraulic cylinder 12 which is mounted on a yoke 14 of a valve 16. A piston 18 is slidably mounted within the cylinder 12 and includes an actuation rod 20 which extends from a first side 22 of the piston 18 through an opening 24 in a first end 26 of the cylinder 12. The rod 20 has an extended end 28 which is joined by a coupling device 30 to a valve stem 32.

The valve stem 32 extends through packing 33 of a bonnet 34 of the valve 16 to operate a closure member 36, in this case a gate device, of a valve 16. As shown, the piston 18 and thus the closure device 36 are in the open position. The yoke 14 and bonnet 34 may be considered as parts of the body of valve 16.

The prior art valve actuator 10 further includes an accumulator 38 which, preferably, is spherical in shape and includes a pressure wall 40 which is intersected at an opening 42 therein by the cylinder 12. The cylinder 12 is fixedly, sealably joined to the pressure wall 40 and is positioned relative thereto to include a second end 44 which is disposed within the interior 46 of the accumulator 38. The second end 44 of the cylinder 12 is in this prior art embodiment opened to allow high pressure gas within the interior 46 of the accumulator 38 to act on a second side 48 of the piston 18.

During normal valve operation, hydraulic fluid is supplied to the interior of the cylinder 12 through an access hole 50 to act on the first side 22 of the piston 18 to cause it to move axially in opposition to high pressure gas of the accumulator 38 until the valve 16 is in the open position as shown in FIG. 1. When closure of the valve 16 is desired, the hydraulic fluid of the cylinder 12 will be allowed to rapidly discharge through the access hole 50, allowing the high pressure gas to act on the second side 48 of the piston 18 to cause it to move axially in the closed direction.

As thus disclosed, the prior art valve actuator 10 normally provides a reliable means for opening and closing a valve but the relatively rigid coupling 30 will cause all of the force on the piston 18 to be applied to the closure device 36 which could damage the valve during backseating of surface 35 on stem 32 and surface 37 on bonnet 34 if the pressure of the hydraulic fluid and the high pressure gas are not accurately maintained. Additionally, it can be seen that any effort to limit the force applied to the backseat would be greatly complicated if the high pressure gas of the accumulator were allowed to escape through leakage or rupture of the accumulator. Accordingly, some valve actuators of this type have been improved to include a partial closure over the second end 44 of the cylinder 12 to limit the upward movement of the piston 18 when the valve is in the opened position. However, the distance between the closure at the second end 44 and the backseat of the valve 16 could not be reasonably manufactured with acceptable tolerances to insure that excessive force would not be applied to the backseat. Obviously, there would be expansion and contraction of the actuator rod 20 and the valve stem 32 so that either full force by the hydraulic fluid would be applied to the backseat or potentially no force would be applied to the backseat if the piston 18 were against the closure and the rod and stem too long to bring the closure element 36 to the backseated position.

Therefore, there have been heretofore utilized different coupling devices from the coupling device 30 shown in FIG. 1. These devices (not shown) utilize some form of spring or biasing device in a lost motion fashion to allow the piston 18 to fully seat against the closure at the second end 44 of the cylinder 12 while transmitting a predetermined force to the valve stem 32 to provide proper spacing and pressure for backseating. The present invention is intended to replace such a coupling device so that a simpler, more direct coupling device, such as coupling device 30, might be utilized while still providing for proper backseating.

Also, as seen in FIG. 1 of the prior art valve actuator 10, there is provided a feature which is intended to insure that hydraulic oil will not be allowed to leak into the interior 46 of the accumulator 38. The piston 18 is provided a pair of sealing rings 52 generally for this purpose but should the sealing ring 52 adjacent the first side 22 allow hydraulic fluid to leak thereby, a means is provided for preventing the hydraulic fluid from leaking by the other sealing ring 52. Accordingly, radially extending passages 54 communicate the space between the sealing rings 52 with an axial passage 56 of the actuator rod 20. The passage 56 extends to the extended end 28 of the actuator rod 20 to terminate at a fitting 58 which can selectively be opened to the atmosphere. Therefore, should leakage occur as described above, the hydraulic fluid would pass through the passages 54 and the axial passage 56 to be discharged to atmosphere through the fitting 58. Since the interior 46 of the accumulator 38 is at a significantly higher pressure than these passages, the hydraulic fluid would not be able to leak by the sealing ring 52 adjacent the second side 48 of the piston 18.

Figure 2:
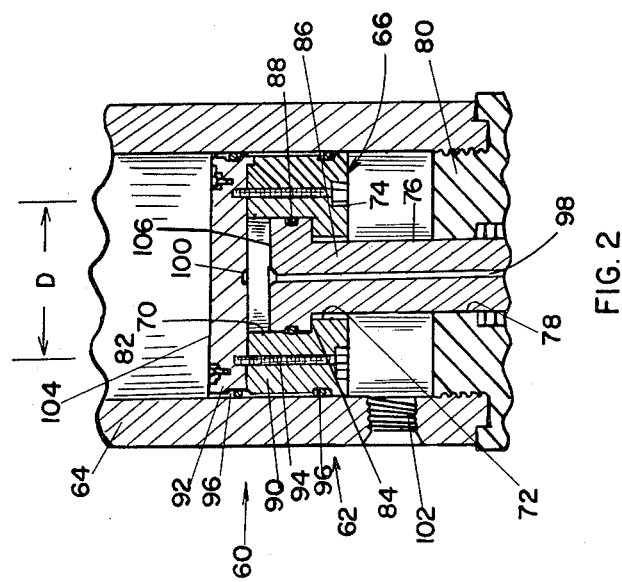
FIG. 2 is a fragmentary sectional side view of the preferred force limiting device including various features of the invention and demonstrates the position of the elements at the time the valve is being opened.

As seen in FIG. 2, the preferred force limiting device 60 can be utilized in a valve actuator 62 which again has a cylinder 64 similar to cylinder 12 mentioned above. Unless otherwise indicated, the various elements of the actuator 62 will be identical to the elements as described hereinabove for the prior art actuator 10.

The force limiting device 60 includes a primary piston means 66 mounted within the cylinder 64 for sliding axial movement therein for generally positioning the valve closure element. However, the preferred piston means 66 has a cylindrical bore 70 having a diameter D and an opening 72 at a first side 74 of the piston means 66 which opening can be seen to have a lesser cross sectional area than does the bore 70. An actuator rod 76 extends loosely through the opening 72 to extend from the first side 74 through a hole 78 in a first end 80 of the cylinder 64 and terminates at an extended end thereof which is outwardly of the cylinder 64 and is capable of being joined to a valve stem as was the case in the prior art valve actuator 10. A secondary piston head 82 is secured at a first side 84 thereof to the other end 86 of the rod 76 and is disposed within the cylindrical bore 70 for retention therein by a portion of the piston means 66 around the opening 72. The piston head 82 includes a sealing ring 88 and makes sliding, sealed contact with an interior of the bore 70 for limiting axial movement therein.

While it can be seen that in the preferred force limiting device 60 the rod 76 and the opening 72 have a circular cross section, it will be seen that other cross sectional shapes might be reasonably employed without altering the effectiveness of the invention.

The piston means 66 is generally formed of two elements, a first piston element 90 which includes the bore 70 and a second piston element 92 which is bolted to element 90 with a plurality of bolts 94 to close the upper end of cylindrical bore 70. Each element 90, 92 has a sealing ring 96 to provide the piston means 66 with a general sealing configuration as shown in the prior art valve actuator 10. Again, the actuator rod 76 includes an axial passage 98 to provide a leakage path from a space between the sealing rings 96 through radially extending passages 100 (perhaps better seen in FIG. 3) and the cylindrical bore 70 for communication with the atmosphere.

Figure 4:
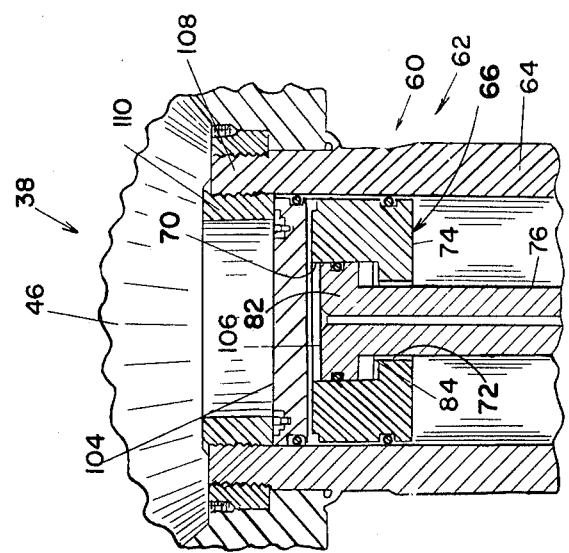
FIG. 4 is a fragmentary sectional side view of the embodiment of FIG. 2 shown in a position for backseating.
Figure 3:
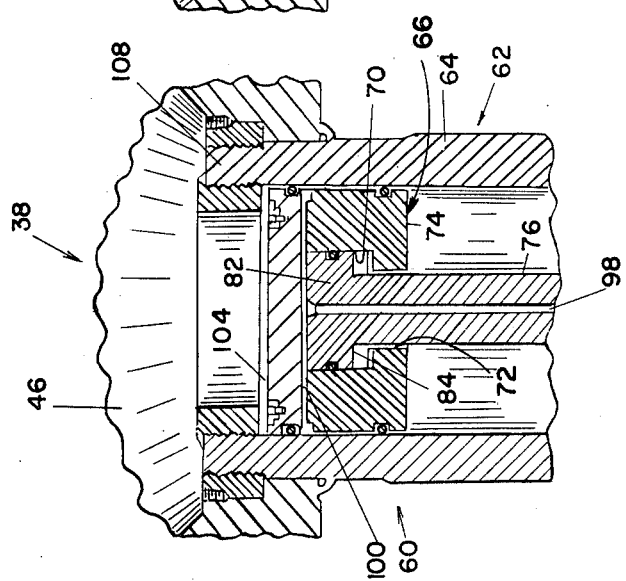
FIG. 3 is a fragmentary sectional side view of the embodiment of FIG. 2 shown in a position just prior to backseating with little or no flow pressure differential across the valve.

The elements as thus described are shown from a different angular position in FIGS. 3 and 4. However, the piston means 66 is shown in a different location in each of FIGS. 2, 3 and 4 for a better explanation and understanding of the force limiting device 60 of the preferred embodiment. Accordingly, each of these figures will be separately explained for a better understanding of the forces which are acting on the piston means 66 and the piston head 82 to enable the preferred embodiment to satisfy the objectives of the invention. As seen in FIG. 2, the valve would still be in a closed position and hydraulic fluid has been supplied through an access hole 102 to the interior of the cylinder 64 to apply an upward force to the piston means 66. While designed leakage through opening 72 by actuator rod 76 will cause the hydraulic fluid to act on the first side 84 of the piston head 82, the amount of force required for lifting the valve closure element from its seat is sufficiently large so that the force being required is actually generated by the hydraulic fluid acting on the piston means 66 rather than on the piston head 82. As a result, the piston head 82 is positioned axially within the bore 70 for direct contact between the head 82 and the piston element 90. The large force created is thereby transmitted through the piston head 82 and the actuator rod 76 to cause the valve to open. It should be understood that the force being applied to the piston means 66 is generally equal to the pressure of the hydraulic fluid times the effective area of the first side 74 of the piston 66 less the pressure of the high pressure gas from the accumulator times the effective area of a second side 104 of the piston means 66. Similarly, the force being applied to the piston head 82 by the hydraulic fluid will be the pressure of the hydraulic fluid times the effective area of the first side 84 of the piston head 82 less the pressure (in this preferred embodiment, the atmospheric pressure) in the bore 70 above the piston 82 times the area of a second side 106 of the piston head 82. While the resulting force in each case will tend to change depending on the amount of force being applied by the hydraulic fluid, during the supply of hydraulic fluid required to initially open the valve, the resulting force on the piston means will be greater. Therefore, direct contact between the piston means 66 and the piston head 82 will transfer the force needed to the valve stem for initially opening the valve. However, once the initial opening force required is reduced, the pressure of the hydraulic fluid will similarly reduce as the piston means 66 is allowed to move axially up the cylinder 64. At this lower force condition for the hydraulic fluid the resulting areas and pressures are such that the primary force moving the valve stem and the closure element is created at the piston head 82. Therefore, the piston head 82 will move axially within the bore 70 to a position as generally shown in FIG. 3. The amount of force during this travel of the valve stem and closure element will generally be the force which is required to overcome friction in the packing which seals the extension of the valve stem through the body assuming that the flow press differentials are relatively low.

As shown in FIG. 3, the hydraulic fluid has caused the piston means 66 to travel axially in the cylinder 64 toward the second end 108 thereof to position the valve at backseating. In this position, just prior to backseating, the hydraulic fluid is still producing a resulting force on the piston head 82 and actuator rod 76 which is greater than the resulting force acting on the piston means 66. As a result, the piston head 82 is still disposed upwardly within the cylindrical bore 70.

With the upward movement of the actuator rod 76 now restricted by the closure element 36 being held against the backseat, as seen in FIG. 4, the pressure of the hydraulic fluid being supplied to the cylinder 64 continues to increase to insure that there is adequate force applied to the valve during backseating. This force on the piston head 82 and rod 76 will again be determined by the area of the first side 84 of the piston head 82, the second side 106 of the piston head 82 and the respective pressures acting thereon. The increase in hydraulic fluid pressure will also act on the effective area of the first side 74 of the piston means 66. This force from beneath the piston head 82 and piston means 66 will be opposed by the pressure of the high pressure gas acting on the second side 104 of the piston means 66 but will result in a significant positive upward force on the piston means 66 and the piston head 82 to cause them to continue upwardly within the cylinder 64 until piston means 66 makes contact with a piston stop 110 at the second end 108 of the cylinder 64.

Although the preferred force limiting device 60 might be utilized for any type of valve independent of size, it is presently being considered for globe valves and gate valves ranging from 6 inches to 32 inches. However, it would be helpful to present some parameters expected for a typical valve configuration. It has, for example, been determined that for a 16 inch gate valve the desired backseating force could range between 11,000 and 12,000 pounds. A typical hydraulic system being used to operate a 16 inch gate valve would be expected to operate at as high a pressure as 4,500 p.s.i. This level of pressure is sufficient to create an opening force (that needed to lift the gate initially off the seat) in the range of 130,000 to 140,000 pounds of force. Obviously, it can be seen that having a hydraulic system capable of applying a tensile force of this magnitude to the actuator rod would be unacceptable for backseating. Therefore, such a force is utilized when the elements of the valve actuator are in the position as shown in FIG. 2. However, when the valve is backseated as shown in FIG. 4, the piston means 66 is being held against the piston stop 110 by the hydraulic fluid producing a significantly higher unward force on the piston means 66 than can the hydraulic oil as it acts independently on the piston head 82. Hydraulic fluid in this condition produces a pressure on the piston head 82 which is opposed by a predetermined fluid pressure, atmosphere pressure in the preferred embodiment, to produce a maximum tensile force on the actuator rod 76 which is significantly less than the hydraulic fluid system is capable of providing and actually does provide during initial opening of the valve.

Specific dimensions and areas for the various surfaces mentioned above would have to be determined according to the specific requirements for the valve with which the valve actuator is employed. Therefore, each force limiting device would have to be specifically designed for its valve depending on the expected forces required to unseat the valve, forces required for backseating the valve and forces required for rapidly closing the valve.

Therefore, it can be seen that the preferred force limiting device 60 can be employed to limit the tensile force being applied to an actuator rod during a backseating condition and that the system can also provide for the leakoff feature described above which would prevent hydraulic fluid from leaking by both sealing rings 96 into the interior 46 of the accumulator 38. To further demonstrate the applicability of the invention, it should be shown that other means can be provided for communicating fluid pressure from an external source for the proper application of force to the piston head 82.

Figure 5:
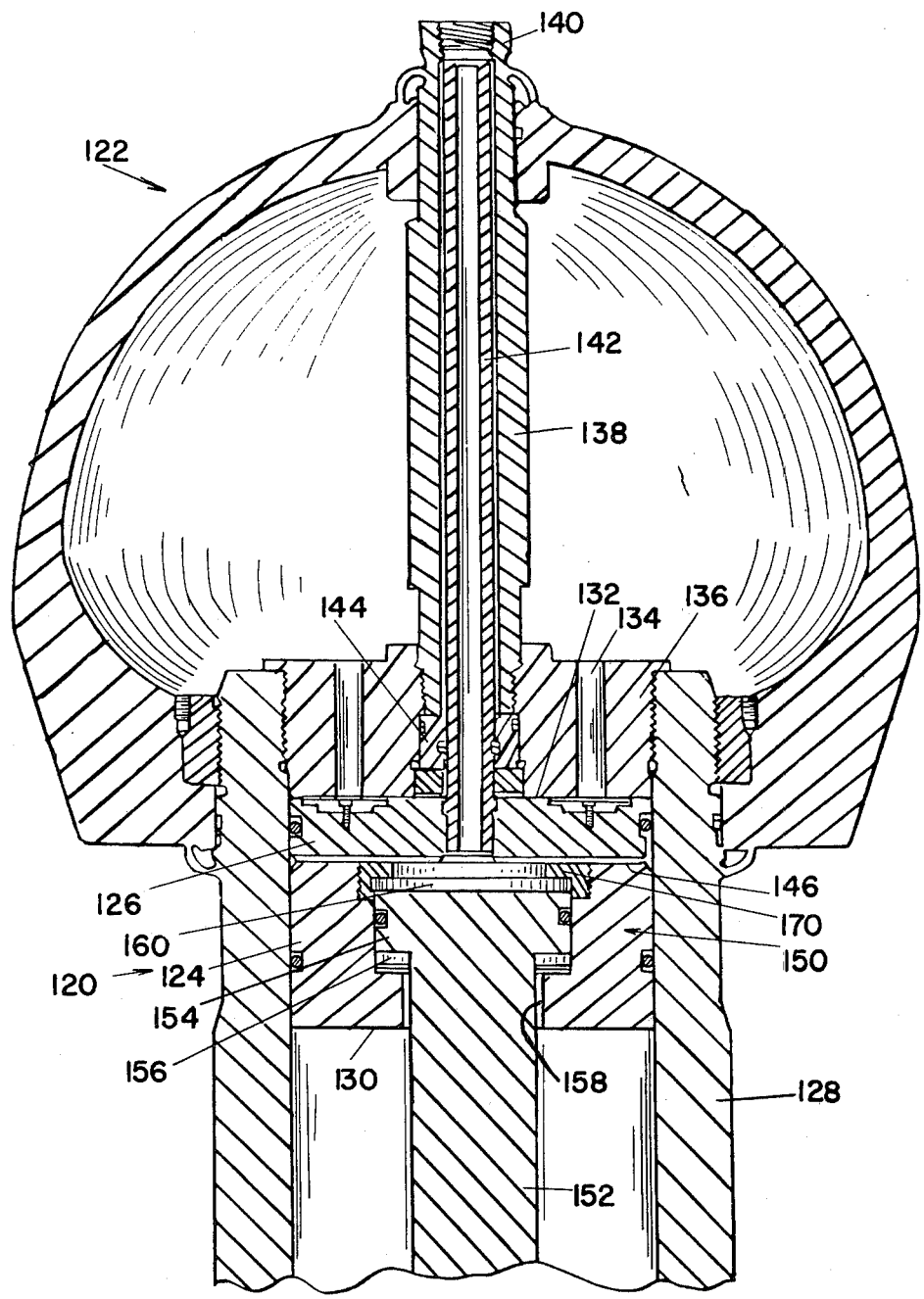
FIG. 5 is a sectional side view of an alternative embodiment of the invention with the elements thereof shown in a position for backseating.

As seen in FIG. 5, there also exists a different valve actuator 120 which utilizes hydraulic fluid and high pressure gas in an accumulator 122 in the manner generally described above. However, the valve actuator 120 utilizes a pair of pistons 124, 126 which are independently, slidably mounted within a cylinder 128. During normal operation, both pistons move axially within the cylinder 128 with the hydraulic fluid being applied to a first side 130 of the piston 124 and high pressure gas being applied to a first side 132 of the piston 126 through access holes 134 which extend through an end closure device 136 rigidly fastened to the end of the cylinder 128.

However, this valve actuator 120 includes structure for allowing hydraulic fluid to be utilized to close a valve should the actuator 122 develop a leak or be ruptured to significantly reduce the pressure of the high pressure gas therein to a level which would adversely affect closure of the valve.

The valve actuator 120 includes a tubular housing 138 which is secured to the end closure 136 and extends therefrom to the upper portion of the accumulator 122. The tubular housing 138 has an extended end fitting 140 external of the accumulator 122 which is joined to a piping system which can be selectively utilized to introduce hydraulic fluid thereto or can be vented to atmosphere. The piston 126 includes a hollow tube 142 extending from its first side 132 to be received within the interior of the tubular housing 138. Sealing means 144 is provided between the tubular housing 138 and the hollow tube 142 at the end closure 136 to allow sealed, sliding contact between the hollow tube 142 and the tubular housing 138. The hollow tube 142 is sufficiently long to maintain this contact throughout axial travel of the piston 126.

A radially extending groove 146 is provided in at least one of the abutting surfaces of the pistons 124, 126. Therefore, if high pressure gas is unavailable to close the valve, hydraulic fluid can be supplied to the tubular housing 138 through the extended end 140. The hydraulic fluid will continue to pass through the hollow interior of the tube 142 to act on the upper surface of the piston 124. When hydraulic fluid is supplied between the pistons 124, 126, the piston 126 will be held against the end closure 136 and the piston 124 will be caused to move downward for closure of the valve.

As explained, it can be seen how the actuator 120 can be caused to close a valve is high pressure gas is lost and if an actuator rod were rigidly secured to the piston 124 in a configuration in which the present invention was not being utilized.

However, as seen in FIG. 5, a pressure limiting device 150 is installed in piston 124 and again includes an actuator rod 152 with an enlarged piston head 154 thereon. The piston 154 is sealably and slidably disposed within a cylindrical bore 156 in piston 124 which narrows to an opening 158 at the first side 130 of the piston 124. During normal operation, the piping associated with fitting 140 would be opened to atmosphere so that the space between the sealing rings associated with pistons 124, 126 would be vented for accommodating hydraulic leakage and atmospheric pressue would be acting on the upper side 160 of the piston head 154. The relative position of the piston head 154 within the cylindrical bore 156 would be same throughout movement of the pistons 124, 126 as was the case in the embodiment shown in FIGS. 2-4.

If the high pressure gas of the actuator 120 were unavailable, the valve could be closed by closing the vent associated with the fitting 140 and introducing hydraulic fluid to the tubular housing 138. Supplying hydraulic fluid between pistons 124 and 126 would allow the piston 124 to be moved axially for closing the valve. The hydraulic fluid would cause the piston head 124 to be positioned downwardly with respect to piston head 154 to cause a stop collar 170 theadedly mounted within the bore 156 to make contact with and apply a force to piston head 154 and the actuator rod 152 sufficient to close the valve.

Having thus shown two embodiments of the invention, which can be incorporated in a valve actuator of the type which utilizes a hydraulic-high pressure gas configuration, it should be pointed out that other types of actuators might also be properly fitted with a force limiting device of the present invention. For example, if a valve actuator were of the type which simply used a hydraulic cylinder and selectively applied hydraulic fluid at opposite sides of a piston member slidably disposed therein, a force limiting device of the present invention could similarly be utilized to limit the tensile force being applied to the actuator rod during backseating. It should be clear that even though hydraulic fluid might be introduced to both sides of the piston, a central cavity could be provided which could be vented to atmosphere to again control the amount of tensile force on the actuator rod when the piston is positively located against a cylinder and stop in the direction for opening the valve.

Although in the preferred embodiment the source of fluid pressure being applied to the piston head has been air at atmospheric pressure, it should also be obvious that any other system utilizing a gas or fluid at a predetermined pressure could be employed with the same results. Clearly, alterations could be made to the invention as explained in the preferred embodiment while still being included within the scope of the invention as claimed.

We claim:

1. In combination, a valve and actuator therefor, said valve being comprised of a body, a closure member mounted within said body for linear movement between valve closed and valve open position, a valve stem connected to said closure member, cooperating backseating means on said body and said stem adapted for fluid-tight sealing engagement when said closure member is in valve open position to prevent the escape of fluid from the interior of said body, said actuator being comprised of a primary cylinder, a primary piston mounted within said primary cylinder for linear movement from a first position corresponding to valve closed position to a second position corresponding to approximately valve open position, a secondary cylinder movable with said primary piston, a secondary piston mounted within said secondary cylinder for linear movement therein relative to said primary piston between a first limit and a second limit, a piston rod extending from said secondary piston to the exterior of said primary piston, means to connect said piston rod to said stem, means to apply fluid pressure to one side of said primary piston to move it from said first position to said second position, abutment stop means adapted to arrest movement of said primary piston at said second position whereby the effective thrust of the fluid pressure on said primary piston is absorbed by said stop means when said primary piston is urged against said stop means under the influence of the fluid pressure applied to said one side of said primary piston, means to apply fluid pressure to said secondary piston to urge it away from said first limit to effect sealing engagement of said backseating surfaces when said primary piston is held against said stop means by the fluid pressure applied to said one side of said primary piston whereby the thrust on said piston rod and said backseating means when said primary piston is urged against said stop means is limited to the thrust of the fluid pressure applied to said secondary piston.

2. The invention defined in claim 1, in which said means to apply fluid pressure to said secondary piston is comprised of a passage in said primary piston connecting the interior of said primary cylinder to the interior of said secondary cylinder.

3. The invention defined in claim 2, in which said passage is comprised of a passage in said primary piston through which said piston rod extends in loosely fitting relationship.

4. The invention defined in claim 2, in which the fluid applied to said one side of said primary piston is hydraulic fluid.

5. The invention defined in claim 4, together with means to apply fluid pressure to the other side of said primary piston to move it from said second position to said first position, said last mentioned means being an accumulator the interior of which is in communication with said other side of said primary piston, said accumulator being charged with gas under pressure.

6. The invention defined in claim 1 in which said secondary piston is adapted to be positioned between said first and second limits of its travel relative to said primary piston when said primary piston is being urged against said stop means and said backseating means are in engagement.

7. An actuator for a valve of the type comprised of a body, a closure member mounted within said body for linear movement between valve closed and valve open position, a valve stem connected to said closure member, cooperating backseating means on said body and said stem adapted for fluid-tight sealing engagement when said closure member is in valve open position to prevent the escape of fluid from the interior of said body, said actuator being comprised of a primary cylinder, a primary piston mounted within said primary cylinder for linear movement from a first position corresponding to valve closed position to a second position corresponding to approximately valve open position, a secondary cylinder movable with said primary piston, a secondary piston mounted within said secondary cylinder for linear movement therein relative to said primary piston between a first limit and a second limit, a piston rod extending from said secondary piston to the exterior of said primary piston, means to connect said piston rod to said stem of said valve, means to apply fluid pressure to one side of said primary piston to move it from said first position to said second position, abutment stop means adapted to arrest movement of said primary piston at said second position whereby the effective thrust of the fluid pressure on said primary piston is absorbed by said stop means when said primary piston is urged against said stop means under the influence of the fluid pressure applied to said one side of said primary piston, means to apply fluid pressure to said secondary piston to urge it away from said first limit to effect sealing engagement of said backseating surfaces when said primary piston is held against said stop means by the fluid pressure applied to said one side of said primary piston whereby the thrust on said piston rod and said backseating means of said valve when said primary piston is urged against said stop means is limited to the thrust of the fluid pressure applied to said secondary piston.

8. The invention defined in claim 7, in which said means to apply fluid pressure to said secondary piston is comprised of a passage in said primary piston connecting the interior of said primary cylinder to the interior of said secondary cylinder.

9. The invention defined in claim 8, in which said passage is comprised of a passage in said primary piston through which said piston rod extends in loosely fitting relationship.

10. The invention defined in claim 8, in which the fluid applied to said one side of said primary piston is hydraulic fluid.

11. The invention defined in claim 10, together with means to apply fluid pressure to the other side of said primary piston to move it from said second position to said first position, said last mentioned means being an accumulator the interior of which is in communication with said other side of said primary piston, said accumulator being charged with gas under pressure.

* * * * *